United States Patent
Coupard et al.

(10) Patent No.: US 12,272,190 B2
(45) Date of Patent: Apr. 8, 2025

(54) MONITORING METHOD, COMPUTER PROGRAM PRODUCT, AND ASSOCIATED MONITORING SYSTEM AND AIRCRAFT BY COMPARING AN IMAGE OF INTEREST FROM A VIDEO STREAM TO A LIBRARY OF SIGNATURES

(71) Applicant: SAFRAN AIRCRAFT ENGINES, Paris (FR)

(72) Inventors: Josselin Xavier Coupard, Moissy-Cramayel (FR); Alrick Patrick Michel Jacques Verrier, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 308 days.

(21) Appl. No.: 17/632,472

(22) PCT Filed: Aug. 6, 2020

(86) PCT No.: PCT/FR2020/051442
§ 371 (c)(1),
(2) Date: Feb. 2, 2022

(87) PCT Pub. No.: WO2021/023950
PCT Pub. Date: Feb. 11, 2021

(65) Prior Publication Data
US 2022/0277601 A1    Sep. 1, 2022

(30) Foreign Application Priority Data
Aug. 7, 2019 (FR) ...................................... 1909040

(51) Int. Cl.
*B64F 5/00* (2017.01)
*B64D 45/00* (2006.01)
(Continued)

(52) U.S. Cl.
CPC .......... *G07C 5/0825* (2013.01); *B64D 45/00* (2013.01); *G07C 5/0808* (2013.01); *B64D 2045/0085* (2013.01); *B64D 47/08* (2013.01)

(58) Field of Classification Search
CPC .............................. B64D 45/00; G07C 5/0825
See application file for complete search history.

(56) References Cited

U.S. PATENT DOCUMENTS

| 8,538,063 B2 * | 9/2013 | Caballero | .............. G06V 20/52 |
| | | | 382/190 |
| 10,055,906 B1 * | 8/2018 | Fournier | ................. F01N 11/00 |

(Continued)

FOREIGN PATENT DOCUMENTS

| EP | 3 216 702 A1 | 9/2017 |
| EP | 3 306 293 A2 | 4/2018 |
| EP | 3 403 938 A1 | 11/2018 |

OTHER PUBLICATIONS

International Search Report mailed on Oct. 28, 2020 in PCT/FR2020/051442 filed on Aug. 6, 2020, 3 pages.
(Continued)

*Primary Examiner* — Jess Whittington
(74) *Attorney, Agent, or Firm* — Oblon, McClelland, Maier & Neustadt, L.L.P.

(57) ABSTRACT

A method for monitoring an aircraft component, including the following steps: receiving, from a video acquisition device, a video stream that represents at least one portion of the component; in the event that the realization of a predetermined condition is detected, extracting a portion of the video stream to form a sequence of interest; identifying, within the extracted sequence of interest, at least one image of interest; including a signature, obtained using each image of interest, with at least one predetermined signature from a library of signatures; and generating an anomaly detection (Continued)

signal if the result of the comparison meets a predetermined criterion.

6 Claims, 1 Drawing Sheet

(51) Int. Cl.
*G07C 5/08* (2006.01)
*B64D 47/08* (2006.01)

(56) References Cited

U.S. PATENT DOCUMENTS

| | | | |
|---|---|---|---|
| 2009/0309762 A1 | 12/2009 | Woelcken et al. | |
| 2010/0211358 A1* | 8/2010 | Kesler | G07C 5/006 |
| | | | 702/184 |
| 2013/0114878 A1 | 5/2013 | Scheid et al. | |
| 2013/0213141 A1* | 8/2013 | Reitmann | G01B 11/16 |
| | | | 73/802 |
| 2014/0184786 A1* | 7/2014 | Georgeson | G01M 99/00 |
| | | | 348/128 |
| 2016/0264262 A1* | 9/2016 | Colin | B25J 19/023 |
| 2017/0259943 A1 | 9/2017 | Fleck | |
| 2018/0079533 A1 | 3/2018 | Suchezky et al. | |
| 2018/0099761 A1 | 4/2018 | Griffiths et al. | |
| 2018/0194487 A1 | 7/2018 | Flynn et al. | |
| 2018/0220189 A1* | 8/2018 | Hodge | G06F 16/7837 |
| 2018/0312272 A1 | 11/2018 | Murugappan et al. | |
| 2018/0346150 A1* | 12/2018 | Remond | G02B 23/24 |
| 2019/0185186 A1* | 6/2019 | Li | G06T 17/00 |
| 2019/0238762 A1* | 8/2019 | Coppock | B64F 5/60 |
| 2020/0177872 A1* | 6/2020 | Herman | H04N 23/56 |
| 2021/0041887 A1* | 2/2021 | Whitman | G05D 1/0238 |

OTHER PUBLICATIONS

Preliminary French Search Report dated Apr. 14, 2020 in French Application 1909040 filed on Aug. 7, 2019, 2 pages, with Translation of Categories).

* cited by examiner

MONITORING METHOD, COMPUTER PROGRAM PRODUCT, AND ASSOCIATED MONITORING SYSTEM AND AIRCRAFT BY COMPARING AN IMAGE OF INTEREST FROM A VIDEO STREAM TO A LIBRARY OF SIGNATURES

TECHNICAL FIELD

The present invention concerns a method of monitoring an apparatus of an aircraft.

The invention also concerns a computer program product, a monitoring system and an aircraft carrying such a monitoring system.

The invention applies to the field of the monitoring of aircraft apparatuses, in particular to the detection of anomalies affecting such apparatuses.

STATE OF THE ART

It is known to equip aircraft with cameras provided to supply, within the cockpit, video streams of apparatuses to monitor, for example an engine or a landing gear. Such images may enable the crew to detect anomalies.

However, such systems do not give full satisfaction.

As a matter of fact, the interpretation of such images requires a high level of expertise to detect and characterize the severity of a possible anomaly.

Among such anomalies, one may cite: the malfunctioning of an engine (leakage of oil and/or fuel, engine shutdown further to flame out, smoke, flames, etc.), the malfunctioning of an apparatus of the nacelle (thrust reversers, for example), the malfunctioning of the flight controls or of the landing gear, or for instance an impact further to ingestion of a foreign body.

Furthermore, such systems are not satisfactory in that they require continuous monitoring by the crew (manual monitoring or precisely by eye), which is not possible. This results in the possibility of not detecting the occurrence of a problem with the engine, landing gear, thrust reverser, etc.

An object of the invention is thus to provide a monitoring system which enables simpler and more effective detection and analysis of anomalies affecting a monitored apparatus of an aircraft, and which does not require continuous involvement by the crew.

DISCLOSURE OF THE INVENTION

To that end, the invention is directed to a method of the aforementioned type, comprising the steps of:
  receiving, from a video acquisition device, a video stream representing at least part of the apparatus;
  in case of detection of fulfillment of a predetermined condition, extracting part of the video stream to form a sequence of interest;
  identifying, in the extracted sequence of interest, at least one image of interest;
  comparing a signature, obtained from each image of interest, with at least one predetermined signature from a library of signatures; and
  generating an anomaly detection signal if the result of the comparison meets a predetermined criterion.

As a matter of fact, by virtue of the creation of a signature from at least one image of interest from the video stream, the method according to the invention allows anomaly detection and analysis not depending on the expertise of an operator. Furthermore, the recourse to a library of signatures confers a high level of flexibility to the monitoring method, in that it is possible for the detection of new anomalies to be implemented simply and rapidly by the recording of new corresponding signatures.

According to other advantageous aspects of the invention, the method comprises one or more of the following features, taken in isolation or in any of the technically possible combinations:
  the apparatus is associated with at least one sensor to generate, over time, a measurement signal representing an operation of the apparatus, the video stream and each measurement signal being synchronized;
  the predetermined condition is fulfilled if, in the measurement signal generated by at least one sensor, an anomaly is detected;
  the identifying step comprises pre-processing provided to reject extrapolated images from the video stream;
  the monitoring method further comprises a diagnostic, based on the video stream, of the video acquisition device;
  the diagnostic of the video acquisition device comprises:
    selecting at least two control images from the video stream, separated in time by a predetermined period; and
    evaluating, from the result of the comparison of the at least two control images, a level of quality and/or a fault of the video acquisition device.

Furthermore, the invention is directed to a computer program product comprising program code instructions which, when run by a computer, implement the method as defined above.

Furthermore, the invention is directed to a monitoring system comprising a video acquisition device and a processing device, in which the video acquisition device is configured for generating a video stream representing at least part of an apparatus to monitor of an aircraft, and the processing device is configured for:
  extracting part of the video stream to form a sequence of interest, in case of detection of the fulfillment of a predetermined condition;
  identifying, in the extracted sequence of interest, at least one image of interest;
  comparing a signature, obtained from the at least one image of interest, with at least one predetermined signature from a library of signatures; and
  generating an anomaly detection signal if the result of the comparison meets a predetermined criterion.

The invention is further directed to an aircraft carrying a monitoring system as defined above.

BRIEF DESCRIPTION OF THE DRAWINGS

The invention will be better understood with the help of the following description which is given by way of non-limiting example and made with reference to the accompanying drawings in which.

DETAILED DESCRIPTION OF SPECIFIC EMBODIMENTS

Figure 1:
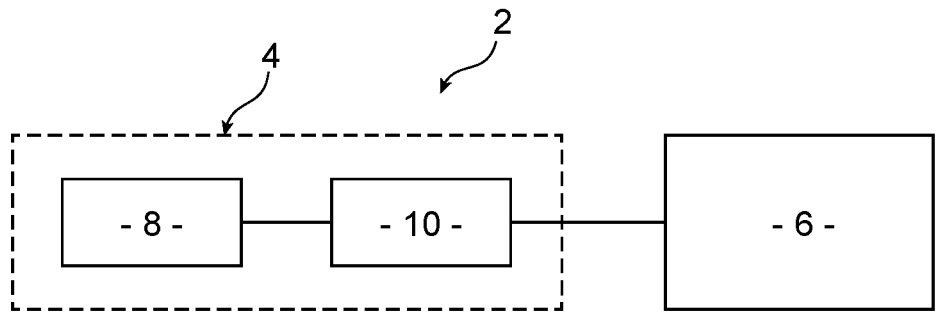
FIG. 1 is a diagram of a monitoring system according to the invention.

A monitoring system 2 according to the invention, carried on board an aircraft (not shown), is illustrated by FIG. 1.

The monitoring system 2 comprises at least one video acquisition device 4 and a processing device 6.

Each video acquisition device 4 is configured to generate a video stream representing at least part of an apparatus of the aircraft associated with the acquisition device, referred to as "monitored apparatus". Furthermore, the processing device 6 is configured to process each video stream and to output, as the case may be, a detection signal representing the detection of an anomaly at the location of a monitored apparatus.

The monitored apparatus is, for example, an engine, a nacelle, a flap, a landing gear, an actuator or for instance a mechanical part of the flight controls of the aircraft.

Each video acquisition device 4 comprises a camera 8 and an acquisition chain 10, the camera being disposed, on board the aircraft, according to the monitored apparatus.

The camera 8 is arranged, on board the aircraft, so that its field of view intercepts at least part of the monitored apparatus.

For example, the camera 8 is arranged, on board the aircraft, so that its field of view intercepts the rear part of an engine or of a nacelle, or for instance slats or flaps. According to another example, the camera 8 is arranged, on board the aircraft, so that its field of view intercepts the front part of an engine or of a nacelle, in particular the blades of the engine. According to still another example, the camera 8 is arranged, on board the aircraft, so that its field of view intercepts the inside of a nacelle or of an engine.

In a conventional manner, the camera 8 is configured to generate an electrical signal representing detected members in its field of view, the acquisition chain 10 being configured to deliver, over the course of time, the video stream representing each part of the corresponding monitored apparatus.

Advantageously, where the monitored apparatus is associated with at least one sensor configured to generate, over the course of time, a measurement signal representing an operation of the monitored apparatus, the acquisition chain 10 is configured to synchronize, with each measurement signal, the video stream it outputs.

The processing device 6 is configured to receive the video stream and to extract therefrom, in case of detection of the fulfillment of a predetermined condition, part of the video stream to form a sequence of interest.

Such a predetermined condition is, for example, the detection of an anomaly in the measurement signal generated by at least one sensor.

As a variant, such a predetermined condition is, for example, the presence of the aircraft in a predetermined phase, such as a phase of being stopped on the ground, a taxiing phase, a take-off phase, a cruising phase, or for instance a landing phase.

The processing device 6 is also configured to identify, in the extracted sequence of interest, at least one image of interest.

Advantageously, if the acquisition chain 10 is configured such that the video stream it outputs is a compressed video stream, the processing device 6 is configured to implement pre-processing for each extracted sequence of interest to discard, that is to say to reject, images of the video stream that were obtained by extrapolation.

For example, such pre-processing consists of rejecting what are referred to as images with inter image predictive coding (that is to say images with predictive coding for instance images with bi-directional predictive coding), which are images extrapolated from what are referred to as images with internal coding (for instance "intra images", or "reference images"). Such terms are commonly used in the field of video coding, with reference to what are referred to as "groups of pictures" (or GOPs). Thus, the images of interest are intra images By way of example, where the video stream is obtained by coding according to the H.264 standard, the reference images, which may constitute images of interest, have a frequency of one image out of four in the video stream, two successive reference images being separated by three images with predictive coding, which will be rejected by the processing device 6 on running the pre-processing.

The pre-processing described above is advantageous, in that the images with predictive coding, which are images extrapolated from intra images, may give rise to inaccuracy and/or misinterpretations in the implementation of the monitoring method according to the invention.

The processing device 6 is, furthermore, configured to generate, from at least one identified image of interest, a corresponding signature.

Preferably, for the generation of such a signature, the processing device 6 is configured to apply, to each image of interest, a predetermined processing.

Such a processing comprises, for example, filtering and/or an adjustment of contrast and/or edge detection and/or an adjustment of colors.

Such filtering comprises, for example, a reduction in optical and/or coding noise, a treatment (described later) of faults by the video acquisition device 4, a correction of blur, a reduction of the contribution of defects, water droplets, dust, etc.

Such a contrast adjustment comprises, for example, an adjustment of the exposure, in particular such that a control region of the monitored region maintains constant brightness over time. Such a control region is, for example, a wing portion. This reduces the impact of the variations in brightness of the surroundings on the detection of anomalies.

Such an adjustment of colors is based, for example, on calibration marking arranged in the field of view of the camera 8.

Such edge detection consists in the detection of edges of objects present in each image of interest, preferably after implementation of the filtering and/or of the contrast adjustment.

The signature represents, for example, edges of members present in the image of interest, for example edges of the monitored apparatus.

According to another example, such a signature represents variations over time between successive images, in particular due to the appearance of members between successive images, or for instance movements. In this case, the processing device 6 is, for example, configured to implement a method using wavelets or hierarchical approaches for detecting such variations.

By way of example, the processing device 6 is configured to generate, from two successive images of interest, a corresponding signature by a difference between the two images of interest. In other words, the signature is the result of the subtraction, pixel by pixel, of the value of a pixel of an image of interest from the value of the same pixel of the other image of interest.

The processing device 6 is also configured to compare each signature obtained with at least one predetermined signature from a library of signatures.

Such a library is, for example, a library of faults. Such a library is, for example, updated by learning at the time of the occurrence of events considered as anomalies. For this, a neural network, possibly assisted by an expert, may be used.

Such a library is, for example, enhanced, over time, by the contributions from all the aircraft carrying the monitoring system 2.

Furthermore, the processing device 6 is configured to generate an anomaly detection signal if the result of the comparison meets a predetermined criterion.

For example, a predetermined criterion is a degree of similarity greater than a predetermined threshold between the signature obtained and a signature of the library.

Such an anomaly detection signal is, for example, provided to trigger a warning.

According to another example, such an anomaly detection signal is used for updating usage counters, in particular the updating of a usage counter associated with the monitored apparatus.

According to still another example, such an anomaly detection signal is used for computing an operational severity estimator.

It follows that such a detection signal may be implemented in the diagnostic and the prognosis of the failures affecting, in particular, the or each monitored apparatus.

Advantageously, the processing device 6 is configured to establish, from the video stream, a diagnostic of the video acquisition device 4.

For example, the processing device 6 is configured to determine, from at least one image from the video stream generated by the video acquisition device 4, designated "control image", a diagnostic relating to the focusing and color calibration of the video acquisition device 4, in particular during a start-up of the monitoring system 2. Such a diagnostic is advantageously carried out on the basis of calibration marking arranged in the field of view of the camera 8.

By way of variant, for a diagnostic on the color calibration, in particular relating to the white balance, the processing device 6 is configured to detect a predetermined member in the control image, for example by the identification of a predetermined member (for example a predetermined portion of the monitored apparatus), especially after the implementation of edge detection, and to compare a homogeneity of the image at the location of said predetermined member with a predetermined homogeneity threshold. The homogeneity determination implements, for example, a median filter.

Preferably, in this case, if the homogeneity of the image at the location of the predetermined member is greater than or equal to the predetermined homogeneity threshold, the processing device 6 determines the diagnostic in accordance with which a white balance may be carried out. Otherwise, the processing device 6 determines the diagnostic in accordance with which a white balance cannot be carried out, and, for example, uses a default setting or an earlier used setting, for the processing of the images of interest.

According to another example, such a diagnostic comprises evaluating, from the result of the comparison of at least two control images extracted from the video stream, a level of quality and/or a fault of the video acquisition device. Such an evaluation is, for example, carried out during a cruising phase of the aircraft.

By "quality level" is meant, in the present application, a capacity of the video acquisition device 4 to perform discrimination between members present in the field of view of the camera 8.

Such faults of the video acquisition device 4 are in particular expressed by invariants in the video stream. Such invariants are, for example, dead pixels of a sensor of the camera 8, or for instance dirt on lenses of the camera 8. Such invariants are, preferably, recorded in memory in the processing device 6, in particular for implementation at the time of the generation of signatures already described.

Figure 2:
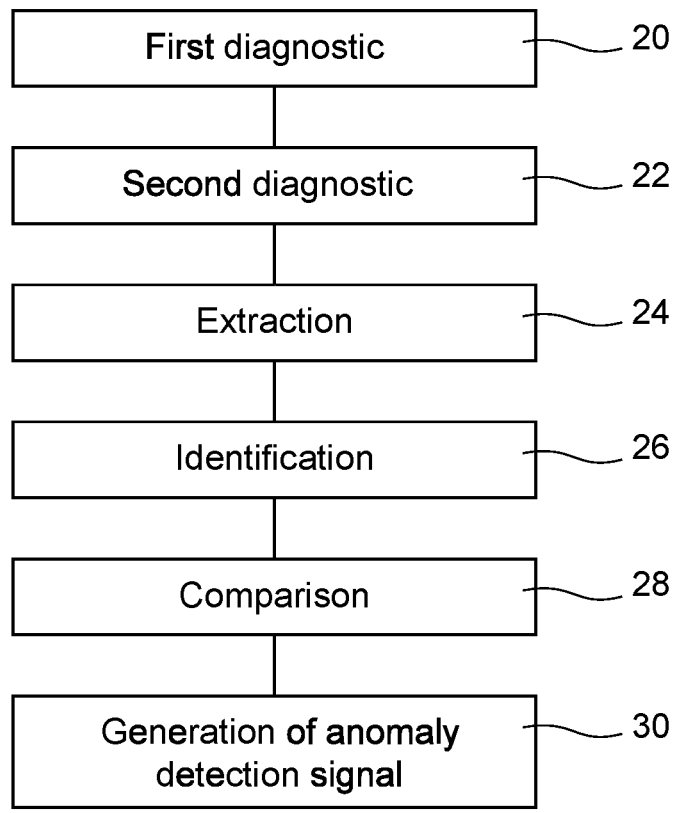
FIG. 2 is a flowchart of the conduct of the monitoring method implemented by the monitoring system for FIG. 1.

The operation of the monitoring system 2 will now be described with reference to FIG. 2.

Further to the start-up of the monitoring system 2, the video acquisition device 4 sends, to the processing device 6, a video stream representing at least part of the corresponding monitored apparatus.

Advantageously, during an initializing step, the processing device 6 establishes, from the first video stream, a first diagnostic 20 of the video acquisition device 4.

In particular, the processing device 6 determines a first diagnostic relating to the focusing and/or the color calibration (or white balance) of the video acquisition device 4, based on the at least one control image coming from the video stream generated by the video acquisition device 4.

In particular, the processing device 6 compares the homogeneity of the image, at the location of the predetermined member, with the predetermined homogeneity, and makes the white balance on the basis of the result of the comparison.

Advantageously, the processing device 6 establishes, from a video stream, a second diagnostic 22 of the video acquisition device 4, later than the first diagnostic, for example several times over time (for example in particular during the cruising phase of the aircraft).

In particular, the processing device 6 determines a second diagnostic comprising evaluating, from the result of the comparison of at least two control images extracted from the video stream, the level of quality and/or a fault of the video acquisition device.

Next, during an extracting step 24, in case fulfillment of a predetermined condition is detected, the processing device 6 extracts a sequence of interest from the video stream.

Next, during an identifying step 26, the processing device 6 identifies, in the extracted sequence of interest, at least one image of interest.

Next, during a comparing step 28, the processing device 6 compares the signature obtained from the at least one identified image of interest with at least one predetermined signature from the signature library.

Preferably, for the generation for such a signature, the processing device 6 first of all applies, to each image of interest, predetermined processing, for example filtering and/or an adjustment of contrast and/or edge detection and/or an adjustment of colors. For example, the predetermined processing is based, at least in part, on the result of the second diagnostic when that is implemented.

Next, if the result of the comparison meets a predetermined criterion, the processing device 6 generates the anomaly detection signal, during an anomaly detection signal generating step 30.

As a variant, the second diagnostic 22 may be carried out at any time during the operation of the monitoring system 2.

The invention claimed is:

1. A method of monitoring an aircraft apparatus, comprising:
   receiving, from a video acquisition device, a video stream representing at least part of the apparatus;
   performing a diagnostic, based on the video stream, of the video acquisition device, the performing the diagnostic of the video acquisition device comprises:
   selecting at least two control images from the video stream, separated in time by a predetermined period, and evaluating, from a result of a comparison of the at least two control images, at least one of a level of quality and a fault of the video acquisition device;

providing a sensor associated with the apparatus, the sensor being configured to generate, over time, a measurement signal representing an operation of the apparatus, the video stream and the measurement signal being synchronized;

in case of detection of fulfillment of a predetermined condition, extracting part of the video stream to form a sequence of interest, the predetermined condition being fulfilled if an anomaly is detected in the measurement signal generated by the sensor;

identifying, in the extracted sequence of interest, at least one image of interest;

comparing a signature, obtained by processing the at least one image of interest by at least one of filtering, adjusting contrast, edge detection, and adjusting colors based on the diagnostic of the video acquisition device, with at least one predetermined signature from a library of known signatures, the library of known signatures comprising a library of faults updated by learning at a time of occurrence of an event considered to be anomalous; and generating an anomaly detection signal if the result of the comparison meets a predetermined criterion.

2. The monitoring method according to claim 1, wherein the identifying step comprises pre-processing provided to reject extrapolated images from the video stream.

3. The monitoring method according to claim 1, wherein the library of signatures is updated using a neural network.

4. A non-transitory computer readable medium comprising program code instructions which, when run by a computer, implement a method comprising receiving, from a video acquisition device, a video stream representing at least part of the apparatus;

performing a diagnostic, based on the video stream, of the video acquisition device, the performing the diagnostic of the video acquisition device comprises:

selecting at least two control images from the video stream, separated in time by a predetermined period, and evaluating, from a result of a comparison of the at least two control images, at least one of a level of quality and a fault of the video acquisition device:

in case of detection of fulfillment of a predetermined condition, extracting part of the video stream to form a sequence of interest, the predetermined condition being fulfilled if an anomaly is detected in a measurement signal generated by a sensor associated with the apparatus, the sensor being configured to generate, over time, a measurement signal representing an operation of the apparatus, the video stream and the measurement signal being synchronized;

identifying, in the extracted sequence of interest, at least one image of interest;

comparing a signature, obtained by processing the at least one image of interest by at least one of filtering, adjusting contrast, edge detection, and adjusting colors based on the diagnostic of the video acquisition device, with at least one predetermined signature from a library of known signatures, the library of known signatures comprising a library of faults updated by learning at a time of occurrence of an event considered to be anomalous; and generating an anomaly detection signal if the result of the comparison meets a predetermined criterion.

5. A monitoring system comprising:

a video acquisition device;

a processing device; and a sensor, wherein the video acquisition device is configured for generating a video stream representing at least part of an apparatus to monitor of an aircraft, the sensor is associated with the apparatus, the sensor is configured to generate, over time, a measurement signal representing an operation of the apparatus, the video stream and the measurement signal being synchronized, and the processing device is configured for:

extracting part of the video stream to form a sequence of interest, in case of detection of the fulfillment of a predetermined condition, the predetermined condition being fulfilled if an anomaly is detected in the measurement signal generated by the sensor;

performing a diagnostic, based on the video stream, of the video acquisition device, the performing the diagnostic of the video acquisition device comprises:

selecting at least two control images from the video stream, separated in time by a predetermined period, and evaluating, from a result of a comparison of the at least two control images, at least one of a level of quality and a fault of the video acquisition device;

identifying, in the extracted sequence of interest, at least one image of interest;

comparing a signature, obtained by processing the at least one image of interest by at least one of filtering, adjusting contrast, edge detection, and adjusting colors based on the diagnostic of the video acquisition device, with at least one predetermined signature from a library of known signatures, the library of known signatures comprising a library of faults updated by learning at a time of occurrence of an event considered to be anomalous; and generating an anomaly detection signal if the result of the comparison meets a predetermined criterion.

6. The monitoring system according to claim 5, wherein the monitoring system is provided in an aircraft.

* * * * *